United States Patent [19]

Alten

[11] 4,224,709
[45] Sep. 30, 1980

[54] TRANSLOADING BRIDGE FOR RAMPS

[76] Inventor: Kurt Alten, Ringstr. 14, 3015 Wennigsen, Fed. Rep. of Germany

[21] Appl. No.: 483

[22] Filed: Jan. 2, 1979

[30] Foreign Application Priority Data

Jan. 3, 1978 [DE] Fed. Rep. of Germany ....... 2800127

[51] Int. Cl.² .............................................. E01D 1/00
[52] U.S. Cl. ................................................... 14/71.3
[58] Field of Search .................. 14/71.1, 71.5, 69.5, 14/71.3; 182/223; 52/121

[56] References Cited

U.S. PATENT DOCUMENTS

| | | | |
|---|---|---|---|
| 2,689,965 | 9/1954 | Fenton | 14/71.7 |
| 2,881,457 | 4/1959 | Rodgers | 14/71.7 |
| 2,993,219 | 7/1961 | Pennington | 14/71.7 |
| 3,138,812 | 6/1964 | Prosser | 14/71.3 |
| 3,167,796 | 2/1965 | Layne | 14/71.3 |
| 3,179,968 | 4/1965 | Lambert | 14/71.7 |
| 3,268,932 | 8/1966 | Hartman | 14/71.3 |

*Primary Examiner*—Nile C. Byers, Jr.
*Attorney, Agent, or Firm*—Becker & Becker, Inc.

[57] ABSTRACT

A transloading bridge for ramps with a bridge plate, the rear end of which is adapted to be pivotally connected to a ramp and the front end of which is provided with an extension adapted to be moved from a retracted position into a moved-out position for resting on a platform to be loaded or unloaded. The extension is also adapted to be moved from its moved-out position into its retracted position. The extension which is located below the bridge plate has longitudinal slots extending in the longitudinal direction of the bridge, while webs serving as reinforcements for the bridge plate extend through the slots and are connected to the bottom side of the bridge plate. Those longitudinal bridge sections of the extension which are separated from each other by the longitudinal slots are reinforced by longitudinally extending additional webs, preferably of U-shape, and are connected to the extension.

14 Claims, 4 Drawing Figures

TRANSLOADING BRIDGE FOR RAMPS

The present invention relates to a transloading or transferring bridge for ramps with a bridge plate which is pivotally connected to the ramp and which, when the bridge is in operation, rests at its front end through the intervention of an extension on the platform to be loaded or unloaded. The extension can be moved out and retracted in the longitudinal direction of the bridge and is provided below the bridge plate, and the bridge plate is at its bottom side provided with webs extending in the longitudinal direction of the bridge plate and serving for reinforcing the same.

In view of the extension being arranged below the bridge plate, the problem is encountered with transloading bridges of the above mentioned type that, with a relatively large stroke of the extension, difficulties may be encountered to provide a sufficiently strong reinforcement for the bridge plate and its extension.

It is, therefore, an object of the present invention so to improve the above mentioned type of transloading bridge that, in spite of the fact that the extension is arranged below the bridge plate and is movable back and forth, the transloading bridge can be subjected to considerable loads.

This object and other objects and advantages of the invention will appear more clearly from the following specification in connection with the accompanying drawing, in which.

The transloading bridge according to the present invention is characterized primarily in that the extension of the bridge plate is provided with longitudinal slots through which webs are extending. These longitudinal slots of the extension do not affect the transloading operation; not even when they become visible from above after the extension has been moved out and when it is necessary to drive over the slotted sections during the loading operation. However, these slots afford the possibility to arrange the webs below the bridge plate also in that area where the extension is located. Thus the reinforcement of the bridge plate is also possible in the area where the bridge plate and the extension overlap, while the extension itself can be reinforced between the said slots in customary manner, which is done preferably by means of longitudinal webs. To this end, also these longitudinal webs may in a bridge-like manner be interconnected while these connections may extend over the slots of the extension or may bridge the same.

Figure 1:
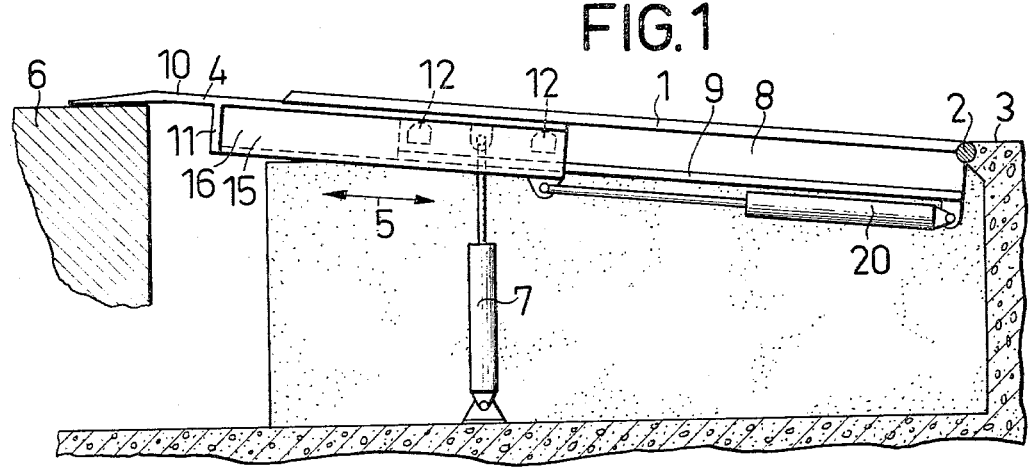
FIG. 1 represents a side view of a transloading bridge in working position according to the present invention.
Figure 2:
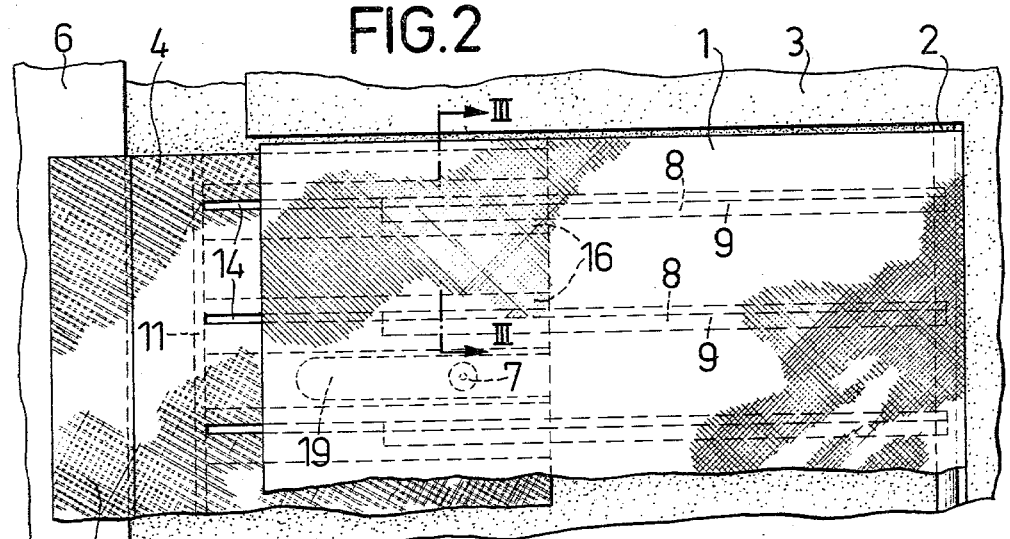
FIG. 2 is a partial top view of the transloading bridge of FIG. 1.

Referring now to the drawing in detail, the near end of the bridge plate 1 is pivotally mounted on a horizontal axle 2 on the ramp 3. At the free front end of the bridge plate 1 there is provided an extension 4 which may be moved outwardly and inwardly in the direction of the double arrow 5. When the bridge is in operation as shown in FIG. 1, the bridge plate 1 and thus the transloading bridge rests exclusively through the extension 4 on the platform 6 to be loaded or unloaded. The transloading bridge can thus without any change in construction be adapted to different heights of the platform 6. For pivoting the bridge plate 1 about the axle 2 there is preferably provided a lifting cylinder 7. This is however not necessary under all circumstances since the pivoting of the bridge plate 1 can also be effected manually if is is not too heavy.

Below the bridge plate 1 and connected thereto are parallel vertical webs 8 extending in the longitudinal direction of the bridge for reinforcing the bridge plate 1. These webs 8 have at their lower end horizontal angled-off arms 9 while the upper end is welded to the bridge plate 1. The webs 8 do not extend entirely up to the free end of the bridge plate 1 but rather end at a distance from this free end, and this distance is determined by the front portion 10 of the extension which is supposed to rest on the ramp in order to be able to move this front portion 10 entirely below the bridge plate 1. The webs 8 are provided with cams 12 having a crowned surface 13 and, more specifically, two cams are always arranged one behind the other in the longitudinal direction of the bridge.

The upper part of the extension 4 consists of a plate-shaped strong sheet of steel, which however, when seen from the end plate 11 is toward the rear provided with longitudinal slots 14 through which extend the webs 8 with slight play. Vertical webs 15 of U-shaped girders 16 are welded to the rim portions of the longitudinal slots 14 of the extension 4. The transverse webs of the girders 16 are designated with the reference numeral 17. The girders 16 surround the webs 8 with angled-off sections 9 in such a way that also the plate which forms the extension 4 is sufficiently reinforced in transverse and longitudinal direction.

Figure 3:
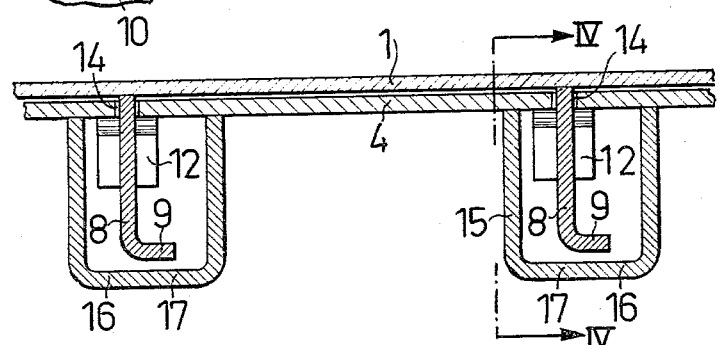
FIG. 3 represents a section taken along the line III—III of FIG. 2, but on a larger scale than the latter.
Figure 4:
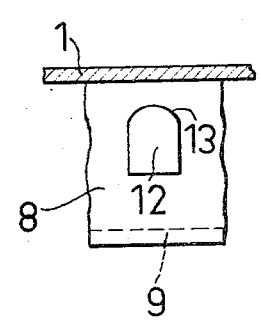
FIG. 4 is a section taken along the line IV—IV of FIG. 3.

As will be seen from FIGS. 1 and 3, the bottom side of the plate forming the extension 4 rests on the cams 12, whereas the surface of the plate is practically engaging the bottom side of the bridge plate 1 or the steel plate forming the same. The distance of the surface 13 from the bottom surface of the steel plate of the bridge plate 1 thus practically corresponds to the wall thickness of the steel plate forming the extension 4 so that at the front end face of the bridge plate 1 there is no step while would be in the way when driving over the bridge. In addition thereto, due to the above mentioned webs 8 and the girders 16 also the steel plates may have a relatively small wall thickness while at the same time the load on the bridge may be relatively great.

For installing the lifting cylinder 7, the extension 4 is provided with a recess 19 which is open toward the rear end of the extension 4. In this way it is possible to move the extension 4 back and forth without being affected or impeded by the lifting cylinder 7. For displacing the extension 4, there is also provided a working cylinder 20 which is operatively connected to the rear end of the extension 4 and is operable to move the extension 4 in forward or backward direction. While according to FIG. 1 the extension 4 is shown in outwardly moved position, in other words in its operative position, the extension 4 can be moved inwardly to such an extent that is will in its entirety be located below the bridge plate 1. In this last mentioned position, the end plate 11 of the portion 10 resting on the ramp will be located at or in the vicinity of the front end face of the webs 8.

It may also be mentioned that the end plate 11 has the girders 16 welded thereto and is thus firmly connected with the girders 16 so that a further reinforcement will be obtained.

Due to the webs 8, on the one hand, and the girders 16, on the other hand, a reinforcement of the transloading bridge will be obtained. Consequently, also relatively long bridges and bridges of such a type can be designed by means of which a long stroke of the extension is obtainable, in other words, which will permit a considerable outward stroke of the extension. In this connection, also the U-shaped design of the girders 16 is of importance. It will be appreciated that these girders extend around the webs 8 while interconnecting adjacent longitudinal sections of the extension 4 which sections are separated from each other by the longitudinal slots 14. Longitudinal slots 14 do not interfere with the driving over the extension 4 because the slots 14 can be kept relatively narrow so that the danger of an interruption of the driving path will be excluded. The slots 14 may have a width of from 6 to 10 mm if a sufficient number of webs 8 is provided.

As will be evident from the above, the present invention affords the possibility to provide the lateral rim portions of the bridge plate with vertical protective plates which may preferably extend up to the front edge of the bridge plate, especially up to the ramp edge associated with the pertaining ramp. In this way the gap between the ramp surface and the bridge plate will be smoothly bridge under all circumstances. These plates also enclose the rear portion of the extension 4 therebetween when the bridge is in its working position. When the extension is in its retracted position, the extension is laterally completely covered by the plates.

It is, of course, to be understood that the present invention is, by no means, limited to the specific showing in the drawing but also encompasses any modifications within the scope of the appended claims.

What I claim is:

1. A transloading bridge for ramps which includes: a bridge plate having a rear end adapted to be pivotally connected to a ramp, said bridge plate also having a front end provided with an extension arranged underneath said bridge plate and movable from a retracted position at least partially outwardly from underneath said bridge plate into an advanced position for resting on a platform, said extension also being movable from said advanced position to said retracted position, said extension being provided with longitudinal slots therethrough extending in the longitudinal direction of said bridge, and first web means connected to said bridge plate and extending through said longitudinal slots while forming reinforcements for said bridge plate, said web means being provided with lateral projections respectively having a supporting surface slidably supporting said extension in close proximity to said bridge plate.

2. A transloading bridge according to claim 1, in which said supporting surface is crowned.

3. A transloading bridge according to claim 1, in which two projections only are arranged one behind the other in the longitudinal direction of said bridge.

4. A transloading bridge according to claim 1, which includes reciprocable cylinder piston means pivotally connected to said bridge plate for lifting and lowering said bridge plate, said extension having that end thereof which faces toward the rear end of said bridge plate provided with a recess open toward said rear end.

5. A transloading bridge according to claim 1, in which said first web means extend substantially perpendicular to said bridge plate and are provided with an angled-off portion located within the lower region of said first web means.

6. A transloading bridge according to claim 1, which includes substantially vertical metal sheets provided on the lateral rims of said bridge plate, said metal sheets extending at least nearly to the end face of said bridge plate and bridging the gap between the surface of a ramp cooperating with said bridge and the bridge plate tilted upwardly.

7. A transloading bridge according to claim 6, in which the substantially vertical metal sheets extend up to the respective ramp edge to be associated with said transloading bridge.

8. A transloading bridge according to claim 1, in which between the slot rims and said first web means there is provided a sufficient play for displacing of said extension.

9. A transloading bridge according to claim 1, in which said longitudinal slots extend to that portion of said extension which is intended to rest on said platform.

10. A transloading bridge for ramps, which includes: a bridge plate having a rear end adapted to be pivotally connected to a ramp, said bridge plate also having a front end provided with an extension arranged underneath said bridge plate and movable from a retracted position at least partially outwardly from underneath said bridge plate into an advanced position for resting on a platform, said extension also being movable from said advanced position to said retracted position, said extension being provided with longitudinal slots therethrough extending in the longitudinal direction of said bridge, first web means connected to said bridge plate and extending through said longitudinal slots while forming reinforcements for said bridge plate, and additional web means extending in the longitudinal direction of said slots and interconnecting those sections of said extension which are separated from each other by said slots.

11. A transloading bridge according to claim 10, in which said additional web means are arranged in the vicinity of said longitudinal slots, and in which each two adjacent ones of said additional web means are interconnected by a transverse web below the respective adjacent first web means.

12. A transloading bridge according to claim 11, in which the front end of said extension for resting on a platform is substantially plate-shaped and has its rear portion confined by an at least nearly vertical end plate connected to said extension, said additional web means extending to said end plate.

13. A transloading bridge according to claim 12, in which said additional web means and said end plate are firmly connected to each other.

14. A transloading bridge according to claim 12, in which said longitudinal slots extend rearwardly to said end platform.

* * * * *